United States Patent
Sardella et al.

(10) Patent No.: US 7,440,215 B1
(45) Date of Patent: Oct. 21, 2008

(54) MANAGING DISK DRIVE SPIN UP

(75) Inventors: Steven D. Sardella, Hudson, MA (US);
Paul Anton Shubel, East Greenwich, RI (US)

(73) Assignee: EMC Corporation, Hopkinton, MA (US)

( * ) Notice: Subject to any disclaimer, the term of this patent is extended or adjusted under 35 U.S.C. 154(b) by 423 days.

(21) Appl. No.: 11/324,984

(22) Filed: Jan. 3, 2006

Related U.S. Application Data

(63) Continuation-in-part of application No. 11/094,024, filed on Mar. 30, 2005, now Pat. No. 7,173,787.

(51) Int. Cl.
*G11B 15/18* (2006.01)

(52) U.S. Cl. .................................... 360/69

(58) Field of Classification Search .............. None
See application file for complete search history.

(56) References Cited

U.S. PATENT DOCUMENTS

| | | | | |
|---|---|---|---|---|
| 4,674,031 A * | 6/1987 | Siska, Jr. | .................. | 700/79 |
| 6,012,124 A * | 1/2000 | Kamo et al. | .................. | 711/114 |
| 6,192,481 B1 * | 2/2001 | Deenadhayalan et al. | ... | 713/324 |
| 6,233,693 B1 * | 5/2001 | Berglund et al. | ............. | 713/340 |
| 6,304,929 B1 * | 10/2001 | Wallach et al. | ............. | 710/302 |
| 6,868,501 B2 * | 3/2005 | Saitou et al. | ................ | 713/330 |
| 6,966,006 B2 * | 11/2005 | Pacheco et al. | ............. | 713/300 |
| 7,363,395 B2 * | 4/2008 | Seto | ............................ | 710/11 |

* cited by examiner

*Primary Examiner*—K. Wong
(74) *Attorney, Agent, or Firm*—Krishnendu Gupta; Jason A. Reyes

(57) ABSTRACT

Apparatus for use in managing disk drive spinup includes a plurality of disk drives newly inserted into a data storage system enclosure that is in an already powered up steady state. The apparatus also includes first and second control cards in the enclosure, and first control logic operable to cause the first and second control cards to coordinate to cause the disk drives to spin up in stages.

13 Claims, 8 Drawing Sheets

MANAGING DISK DRIVE SPIN UP

RELATED APPLICATION

This application is a continuation-in-part application claiming priority to U.S. patent application Ser. No. 11/094,024, filed Mar. 30, 2005 now U.S. Pat. No. 7,173,787, reference nos. EMC-05-033 and 130-047, entitled "Apparatus and Method for Controlling Disk Drive Spin Up" ("'024 application"), the entirety of which patent application is incorporated by reference herein.

FIELD OF THE INVENTION

The present invention relates generally to the field of storage systems, and particularly to mechanisms for managing disk drive spin up in a storage system that supports many disk drives.

BACKGROUND OF THE INVENTION

The need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss. And computing systems of all types are not only accommodating more data but are also becoming more and more interconnected, raising the amounts of data exchanged at a geometric rate.

Thus, today's data storage systems are used in computing environments for generating and storing large amounts of critical data. Some storage systems support many (e.g., hundreds) of disk drives. Because disk drives are mechanical devices, they have higher peak power requirements than the other electronic devices in the system. In today's market it is important that the power subsystem portion of a storage system supports the maximum and peak power requirements of the system without excessive expense.

A typical disk drive consists of circuit board logic and a Head and Disc Assembly (HDA). The HDA portion of the disk drive includes the spindles platters, head arm and motor that make up the mechanical portion of the disk drive. When power is applied to the disk drive, the circuit board logic powers up and the HDA spins up. During spin up, the HDA requires a higher current than when it is in steady state, i.e., already spun up. This higher current is typically more than two times the steady state current. Therefore, if a storage system attempts to spin up many drives in the system at the same time, the system is required to support a peak power level that is much greater than the maximum power required to operate at steady state.

The more disk drives the system supports, the greater the peak power requirement. It is too expensive to provide a power subsystem that can support enough peak power to spin up many disk drives at once, especially when the excess power is not otherwise needed.

Some types of disk drives offer a separate HDA power input but no built in control over the timing of the application of power to the HDA. Some other types offer limited control. For example, Fibre Channel ("FC") disk drives compliant with the SFF-8045 rev. 4.7 standard ("SFF-8045" or "8045") allow the timing of HDA spin up to be controlled via two signal pins, Start_1 and Start_2, that allow the HDA to spin up based on three different conditions. Depending on the state of the Start_1 and Start_2 signals, the disk drive HDA will start drawing current either 1) immediately; 2) after it receives its first SCSI command, or 3) based on its arbitrated loop physical address (ALPA). This provides limited means to stagger the timing of spin up amongst all the drives such that system peak power requirements can be minimized. However, it is difficult for system software to use SCSI commands to control drive spin up timing, because insert and power control signals from the drives are asserted much faster than software can respond.

The ALPA address method is also disadvantageous in at least some circumstances. Consider a storage system capable of supporting 48 disk drives. If a user plugs a single disk drive into the 48th slot in a system in which the other drives are all already at steady state, there is no power-related reason why the drive should not spin up immediately. But because its spin up timing depends on its ALPA address, it will nonetheless take several minutes to spin up.

SFF-8045 describes a POWER_CONTROL (also known as "power control", "Pwr_control", "Pwr_ctrl", or "P_ctl") signal driven to the drive to control 5V and 12V power switches located on the drive. When this signal is asserted, high, 5V and 12V supplies are applied to the drive circuitry. When this signal is negated, low, 5V and 12V supplies are not connected to the drive circuitry, so that the drive circuitry is powered down. As described in SFF-8045, the drive provides a 10 KOhm pull up resistor from this signal to the 5V input to the drive.

An SFF-8045 compliant drive also has Enable Bypass signals −ENBL BYP CH1 and −ENBL BYP CH2 that control Port Bypass Circuits (PBC) located external to the drive. The PBC allows an FC loop to remain functional in the event of a drive failure or removal. Signal −ENBL BYP CH1 controls the PBC for FC channel 1, and signal −ENBL BYP CH2 controls the PBC for FC channel 2. When these Enable Bypass signals are asserted (low), the PBC bypasses the drive on the associated channel. The Enable Bypass signals remain passively enabled during the hot plugging process and remain enabled until the drive has performed appropriate internal initialization.

Further in accordance with SFF-8045, a −DRIVE PRESENT signal ("drive insert" or "drive inserted" signal) is connected to the drive's ground plane. In an enclosure receiving the drive, a backplane can optionally use the signal to passively detect the presence of the drive by using a detection circuit connected to a tie up resistor. When the drive is not installed, the detection circuit can detect the signal provided through the tie up resistor. When the drive is installed, the signal is grounded through the drive's ground signal and the grounded state can be detected by the detection circuit.

When insertion of one or more new drives is thereby detected, the storage system needs to attempt to spin up the drive or drives in compliance with the power constraints of the system.

SUMMARY OF THE INVENTION

Apparatus for use in managing disk drive spinup includes a plurality of disk drives newly inserted into a data storage system enclosure that is in an already powered up steady state. The apparatus also includes first and second control cards in the enclosure, and first control logic operable to cause the first and second control cards to coordinate to cause the disk drives to spin up in stages.

One or more implementations of the invention may provide one or more of the following advantages.

Disk drives added to a steady state disk storage system can be made available for data communication quickly and efficiently without excessive strain on the system's power supply.

Other advantages and features will become apparent from the following description, including the drawings, and from the claims.

DETAILED DESCRIPTION

Figure 1:
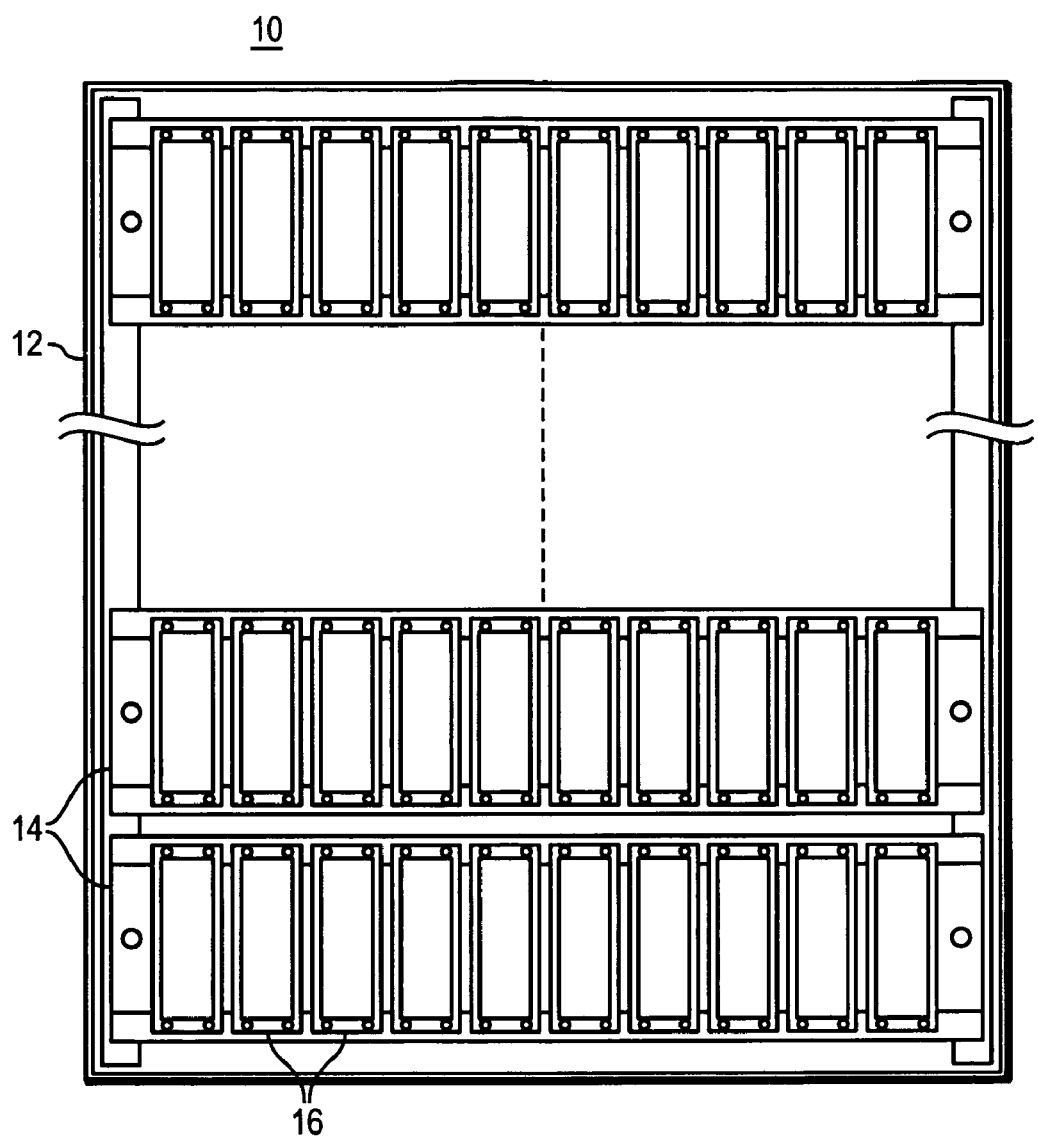
FIG. 1 is a representation of a rack of storage systems in which the invention is employed.

Referring to FIG. 1, there is shown an example of a rack mount system 10 in which the present invention can be employed. A rack mount cabinet 12 includes several storage systems 14. Each storage system 14 has installed therein several disk drives 16.

Figure 2:
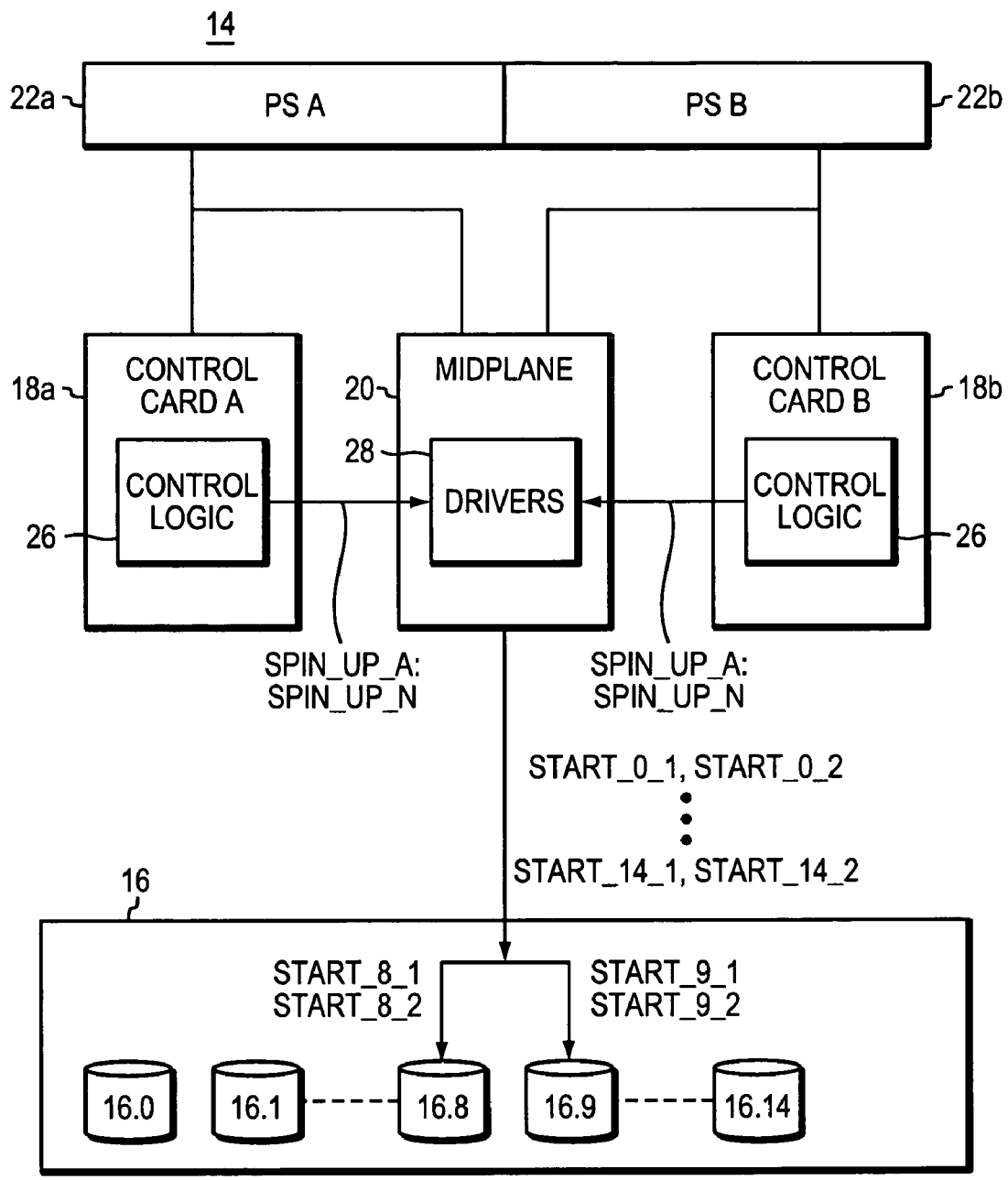
FIGS. 2-4 are schematic representations of components of a storage system of FIG. 1, showing control logic.

The amount of storage in the multi-chassis system can be increased by adding new storage systems 14 to the rack mount system 10, and by adding more disk drives 16 to one or more of the storage systems 14. A functional block diagram of one of the storage systems 14 is shown in FIG. 2. The storage system 14 includes two redundant link control cards (LCCs) 18a and 18b to provide high availability of the system. The LCCs 18a,b are coupled to a midplane 20. Disk drives 16, herein shown as 15 disk drives 16.0-16.14, are also coupled to the midplane 20.

Each LCC 18a,b communicates with all the drives 16.0-16.14 via the midplane 20. Power is supplied to the LCCs 18a,b, the midplane 20, and the disk 10 drives 16 by a redundant set of power supplies 22a,b.

Since each storage system 14 can include up to 15 disk drives 16, it is not reasonable to provide power supplies 22a,b with enough peak power to spin up all 15 disk drives at once. Therefore, the disk drives 16 are spun up in sequential stages. During each sequential stage a certain number of disk drives 16 may be spun up based on parameters related to the power requirements of the system as described in the above referenced '024 application. This allows the system 14 to stagger the timing of spin up amongst all the drives 16 such that system peak power requirements can be minimized. More particularly, as described in the '024 application, a certain number of disk drives 16 may be spun up in each of several successive stages. The control logic 26 controls the timing of disk drive spin up. For example, during a first stage, the control logic 26 causes a first number of disk drives 16 to spin up. The control logic 26 then waits for a period of time, typically about 12 seconds, sufficient for the disk drives 16 to reach steady state. During a next stage a second number of disk drives 16 is spun up. The remaining drives 16 are spun up during successive sequential stages until all drives have been spun up. As described in the '024 application, various system parameters are input to a formula that determines how many drives 16 should be spun up during a stage.

In the generalized embodiment shown in FIG. 2, each controller board 18a, 18b includes identical control logic 26 for driving Spin-up signals Spin-up_A-Spin-up_N to drivers 28 on the midplane 20. The disk drives 16 are herein shown to be Fibre Channel drives. A Fibre Channel drive accepts as input two Start signals that switch on power to the HDA portion of the drive. (Start signals are referred to collectively; individual Start signals are referred to with a suffix.) The drivers 28 on the midplane 20 drive these pairs of Start signals to each of the drives. As shown, signals Start_8_1 and Start_8_2 are coupled to disk drive 16.8, Start_9_1 and Start_9_2 are coupled to disk drive 16.9. The remaining drives are coupled to their corresponding Start signals in a similar manner. When both Start signals for a given drive are asserted, the HDA portion of the drive spins up. The control logic 26 asserts each of the Spin-up signals Spin-up_A-Spin-up_N during successive stages in accordance with the formula.

After the initial drives 16.0-16.5 are spun up during the initial stage, the control logic 26 sequences the assertion of each of the Spin-up signals Spin-up_A-Spin-up_E such that each is asserted one stage after the last.

The system is preferably designed such that the LCCs 18a and 18b can be hot-plugged. That is, when the system is powered up, LCCs can be plugged into and unplugged from the system. No failures should result in either scenario. For example, the LCC 18b may be inserted half a stage time period after the first LCC 18a powered up. As described in the '024 application, the re-assertion of Spin-up_A by the LCC 18b has no effect on the already asserted Spin-up_A signal or on the already spinning up drives 16.6 and 16.7. Likewise, the LCC 18b continues to assert the Spin-up signals after the LCC 18a has already asserted them, having no effect on the system. Operation of disk drive spin up thus occurs within required power parameters during a hot plug. If a user pulls the first LCC 18a out of the system after the second LCC 18b has been plugged in, the spin up of drives x.10-x.14 is harmlessly delayed by half a stage.

The drives 16 in the system are also preferably hot pluggable, meaning that drives 16 can be plugged into the system not only prior to power up but also at any time after it has been powered up. After the system has been powered up and after execution of the requisite number of spin up stages, the result is that all Start bits are in an asserted state. As described below, other means is therefore provided for controlling spin up of newly inserted drives, which means executes a steady state spinup technique.

Drives 16 in accordance with the 8045 specification accept the input herein denoted Pwr_control. When the Pwr_control signal is asserted, power is provided to the entire drive 16, including the logic board and HDA portions. When Pwr_control is deasserted, no power is provided to either the logic board or HDA. If the drive Start inputs are asserted, and the Pwr_control input is deasserted, the drive will not spin up. On the other hand, if the start bits are asserted, and then the Pwr_control input is asserted, the drive will spin up immediately in response to the assertion of Pwr_control.

Figure 3:
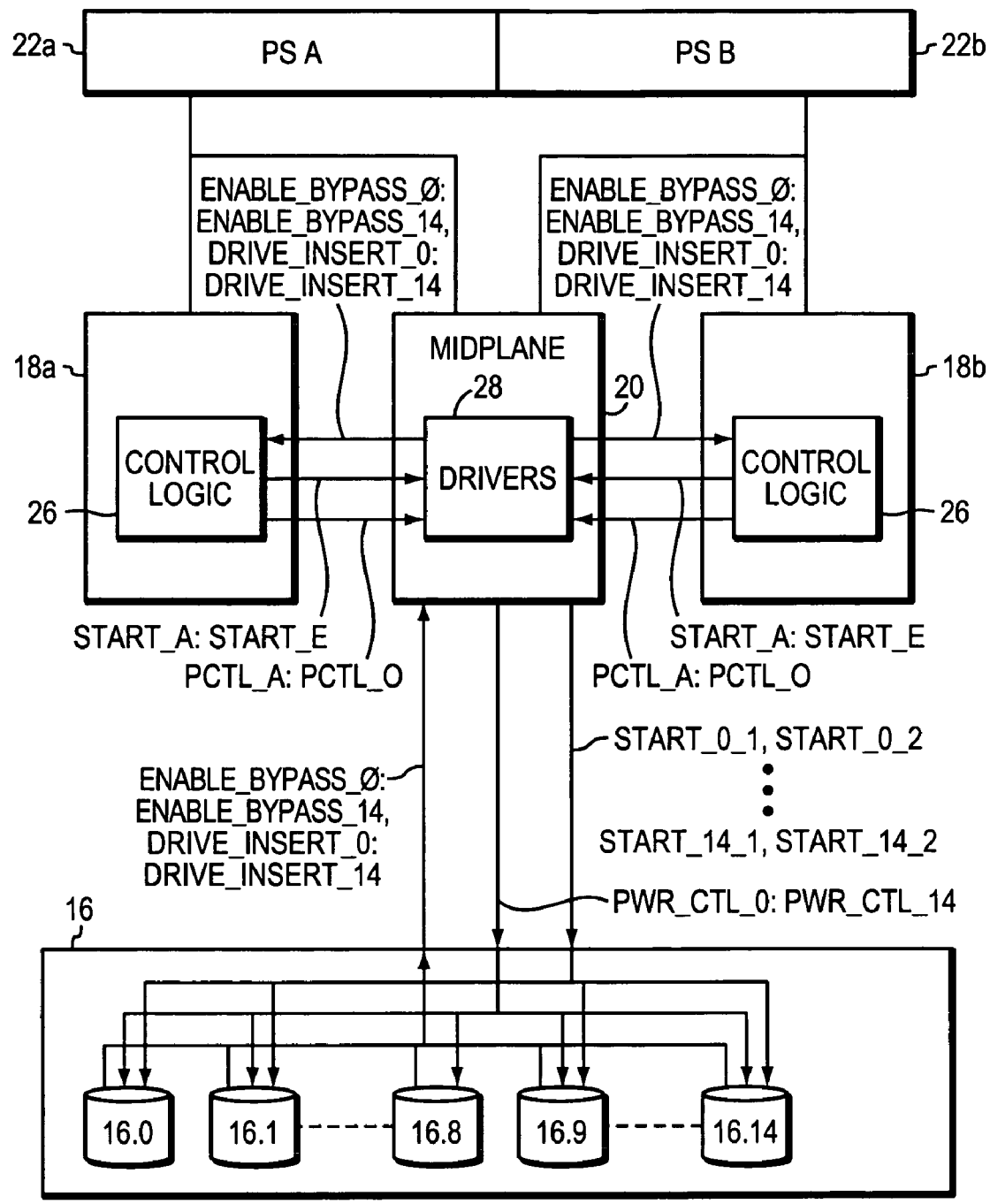

As shown in FIG. 3, the system includes the control logic as shown in FIG. 2. The control logic 26 produces in addition Pctl signals Pctl_A-Pctl_O, which are used to drive Pwr_ctl_0-Pwer_ctl_14 signals to the drives 16.0-16.14 respectively. Each drive 16.0-16.14 provides a corresponding presence (drive inserted) signal Drive_Insert_0-Drive_Insert_14 and can provide a corresponding Enable Bypass signal Enable_Bypass_0-Enable_Bypass_14, each of which is driven to the control logic 26 on each LCC 18a, 18b. When a drive is inserted into the system, the corresponding Drive_Insert signal is asserted.

When a LCC 18a or 18b powers up, the control logic 26 first checks all Drive_Insert_0-Drive Insert_14 signals. The control logic 26 de-asserts all Pwr_ctl signals for drives that are not inserted—i.e. drives whose Drive_Insert signals are deasserted.

Figure 4:
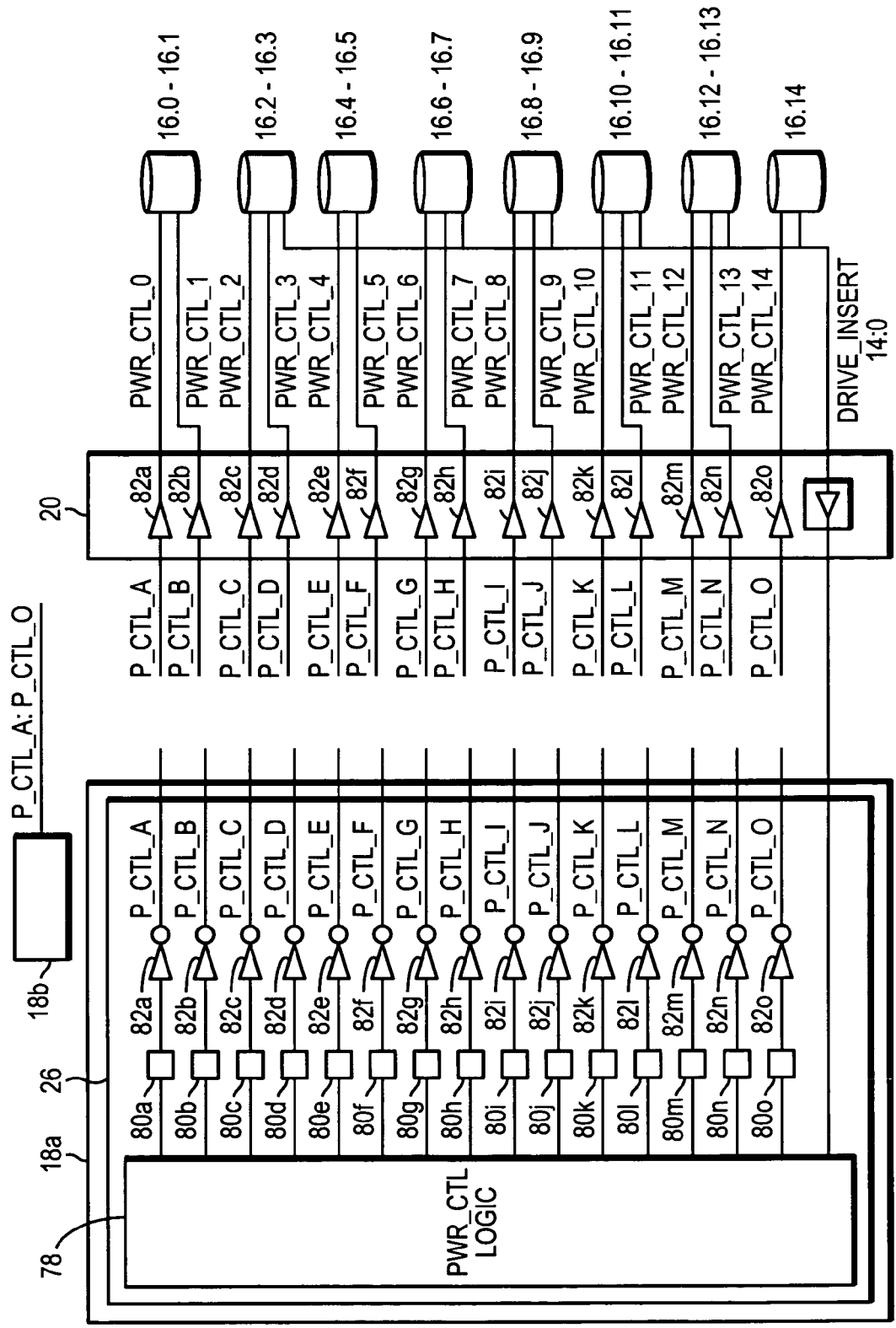

More particularly, as shown in FIG. 4, the control logic 26 further includes power control logic 78. The power control logic 78 accepts as input the Drive_Insert_14 15-Drive_Insert_0 signals from the disk drives 16. The power control logic 78 drives registers 80a-80o. Each register 80a-80o drives a corresponding inverter 82a-82o. The inverters produce as output P_Ctl signals P_Ctl_A-P_Ctl_O. Each signal P_Ctl_A-P_Ctl_O is input to a corresponding driver 84a-84o on the midplane 20. The other LCC 18b also produces the signals P_Ctl_A-P_Ctl_O, and these signals are wire-or'd to the corresponding signals from the LCC 18a. The inverters 82a-82o are therefore preferably open collector drivers with pulled up outputs. The drivers 84a-84o output Pwr_Ctl signals Pwr_Ctl_0-Pwr_Ctl_14, the Pwr_control signals for corresponding disk drives 16.0-16.14. These drivers are also preferably pulled-up open collector drivers.

As described below, a consideration taken into account in steady state spin up is that LCC A 18a and LCC B 18b need to coordinate in at least some circumstances, particularly when deciding to apply power to a drive, because the power control (Pwr_control) signals to each drive slot are wired-or'd in the negative sense, i.e., either LCC can force the removal of power to a drive. Other considerations include the following. After a drive is removed, power must be removed from that slot. When a drive is inserted it must eventually receive power. When drives are inserted into a running system, no more than two can be spun-up simultaneously. When an LCC directs (using the power control signals) that power be applied to a drive it cannot determine directly whether power to that drive is being held off by the other LCC (as described below, a message in the serial channel between the LCCs may be used to convey this information).

For coordination, techniques described below rely on the ability of LCC firmware to control drive spinup, which is used as described above to achieve spinup in stages. As described above, signals are provided from the LCC to the midplane to delineate time intervals (e.g., 12 seconds each) for drive spinup. Logic on the midplane translates the signals to direct a number of drives to spinup based on power constraints.

At power up, each LCC can operate independently—no harm is done when one LCC lags behind the other in directing the drives to spin up. After power up, in the steady state situation, many drives may need to be added at once, but for staging the start bits used to control spin up at power up are not available—only the power control signals are available.

In accordance with one technique for coordination in steady state spin up, the LCCs coordinate in a closed-loop, tightly coupled manner in a master-slave implementation that relies on communication between the LCCs over conventional Inter-IC ("I²C") and/or RS-232 paths (both well known in the art) between the LCCs. In at least one implementation, in steady state spin up, the hardware allows no more than two drives to be spun-up simultaneously after hot-insertion. Implementation may be simplified as described below such that only on drive is spun up at a time after hot-insertion of multiple drives.

As noted above and described in the '024 application, during cold power-up of the DAE with drives already installed, the start bit control lines are used to stage the spinning of the drives. After the cold power-up sequence is completed, the start bits are set to spin up immediately and thereafter drive spin-up is handled by the power control lines to the drives. If a second LCC is hot-inserted into a running DAE the first LCC suspends new drive power-ups until the second LCC has completed its cold-boot drive-spin-up sequence. This information is contained in a status message that the second LCC sends to the first LCC.

In the master-slave implementation for steady state drive-spin-up, the two LCCs are assigned roles as master and slave. The master-slave roles is used instead of a negotiation which can be more complicated. In a specific implementation, LCC B serves as the master and LCC A serves as the slave. When drives are inserted into a steady-state chassis, the master LCC decides the order in which drives are spun-up and brought on-line. One or more of the paths between the two LCCs are used by the master to tell the slave which drive to power-up and in turn one or more of the paths are used by the slave to tell the master when it has complied. As noted above, when the enclosure is in steady-state drive spin-up, staging is handling exclusively with the power control lines to the individual drives.

Figure 5:
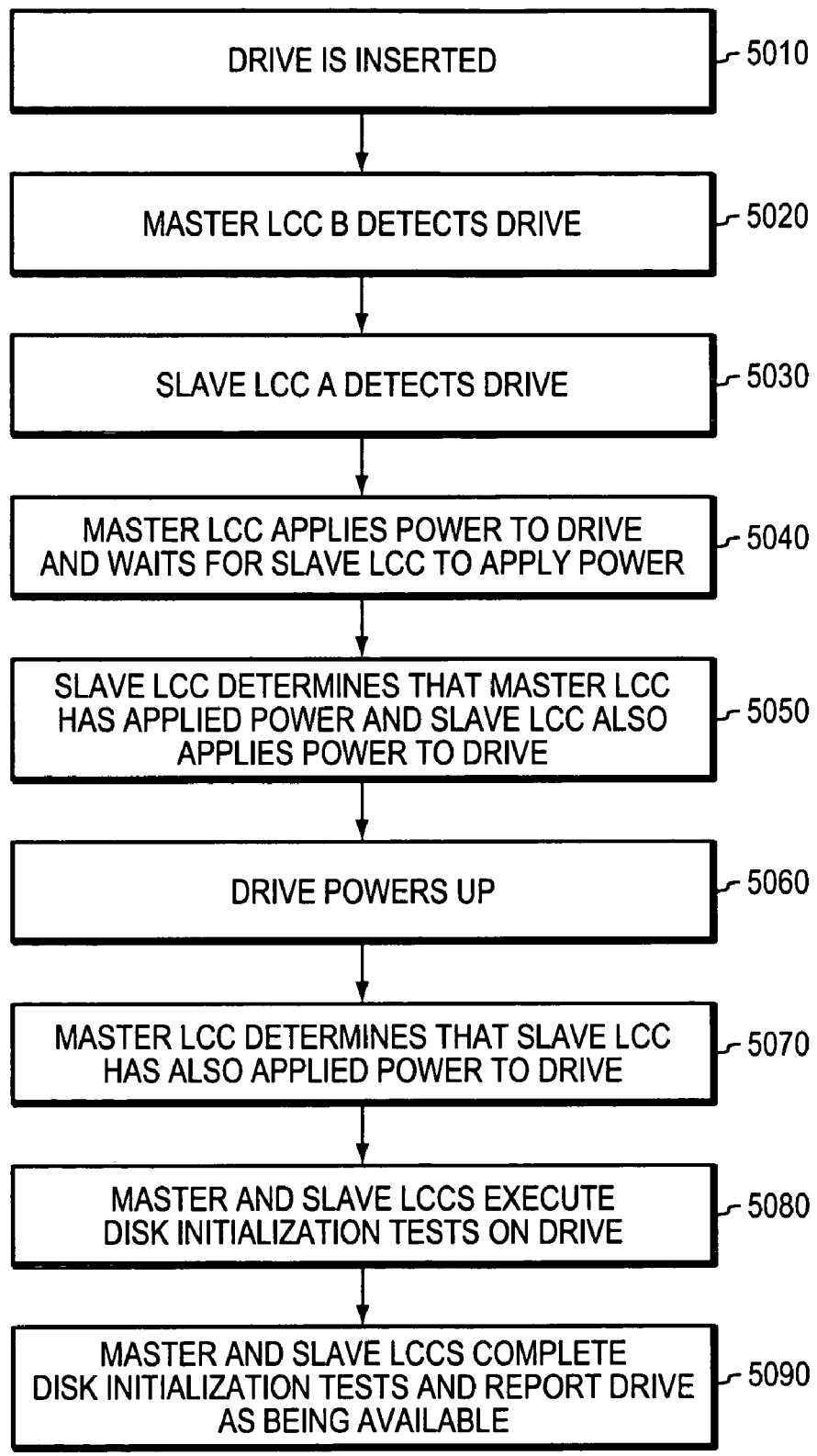
FIGS. 5-8 are flow diagrams of procedures for use in a storage system of FIG. 1.

The following describes the sequence of events when one drive is inserted into the enclosure (FIG. 5):

0) The drive is inserted (step 5010).
1) The master LCC B detects the drive (step 5020).
2) The slave LCC A detects the drive (a few milliseconds sooner or later than master LCC B) (step 5030).
3) The master LCC applies power to the drive and waits for the slave LCC to apply power (step 5040).
4) The slave LCC determines that the master LCC has applied power and the slave LCC also applies power to the drive (step 5050).
5) The drive powers up (step 5060).
6) The master LCC determines that the slave LCC has also applied power to the drive (step 5070).
7) The master and slave LCCs execute separate, unsynchronized disk initialization tests on the drive (step 5080).
8) The master and slave LCCs complete the disk initialization tests at slightly different times and report the drive as being available (step 5090).

Figure 6:
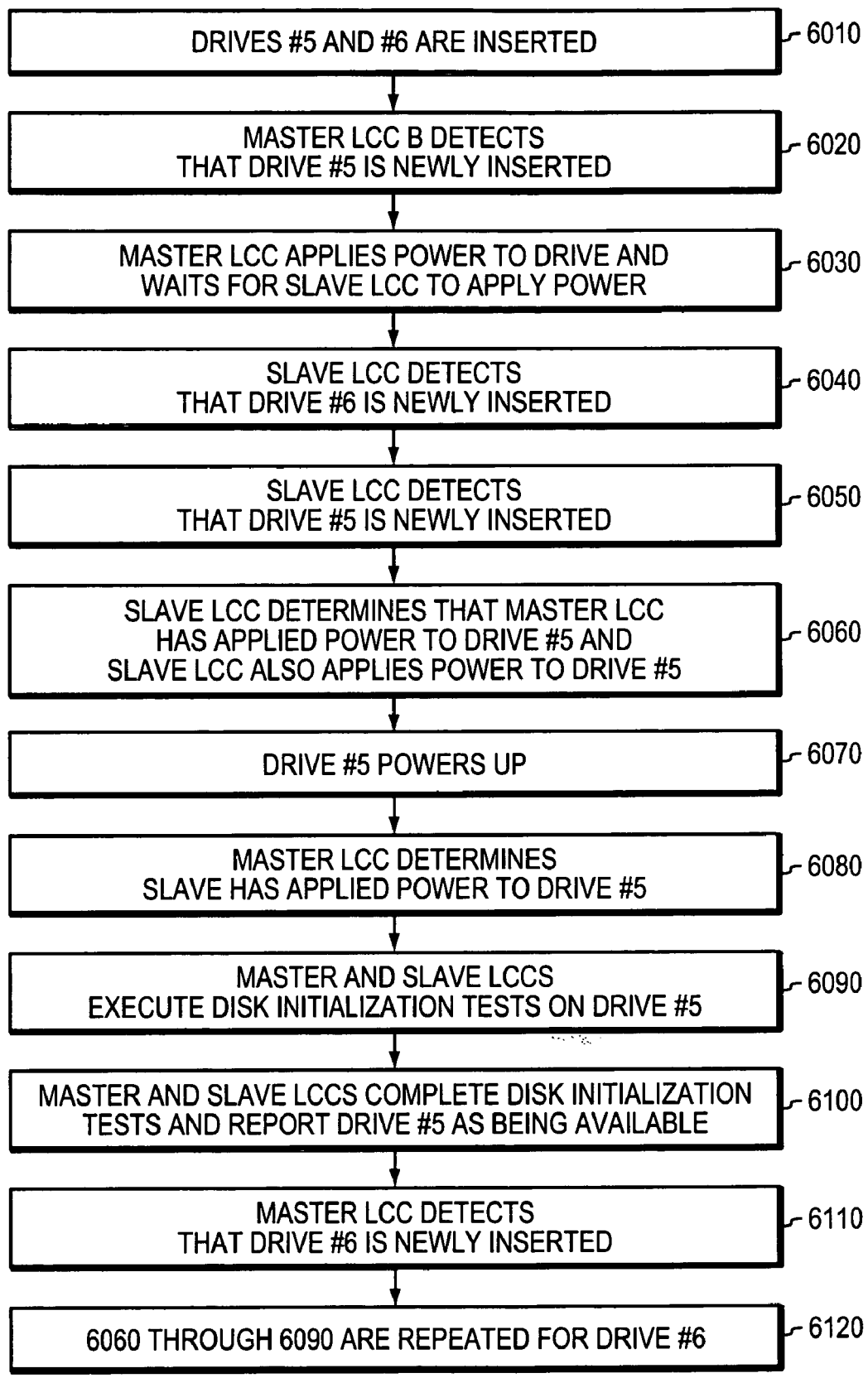

The following describes the sequence of events when multiple drives are inserted into the enclosure at the same time (FIG. 6):

1) Drives #5 and #6 are inserted (step 6010).
2) The master LCC B detects that drive #5 is newly inserted (step 6020).
3) The master LCC applies power to the drive and waits for the slave LCC to apply power (step 6030).
4) The slave LCC detects that drive #6 is newly inserted (step 6040).
5) The slave LCC detects that drive #5 is newly inserted (step 6050).
6) The slave LCC determines that the master LCC has applied power to drive #5 and the slave LCC also applies power to drive #5 (step 6060).
7) Drive #5 powers up (step 6070).
8) The master LCC determines the slave has applied power to drive #5 (step 6080).
9) The master and slave LCCs execute separate, unsynchronized disk initialization tests on drive #5 (step 6090).
10) The master and slave LCCs complete the disk initialization tests at slightly different times and report drive #5 as being available (step 6100).
11) The master LCC detects that drive #6 is newly inserted (step 6110).
12) Sequence parts 6 through 9 above are repeated for drive #6 (step 6120).

The steady state drive-spin-up procedure described above relies on coordination at the firmware level between the two LCCs.

The following example event sequences illustrate cases that involve drive spin-up under varying conditions.

In the case of inserting drives into an enclosure which is already running with one or two LCCs, each drive is individually spun-up for 12 seconds. For example, if 15 drives are inserted simultaneously, it takes two minutes for all 15 drives to become available.

Figure 7:
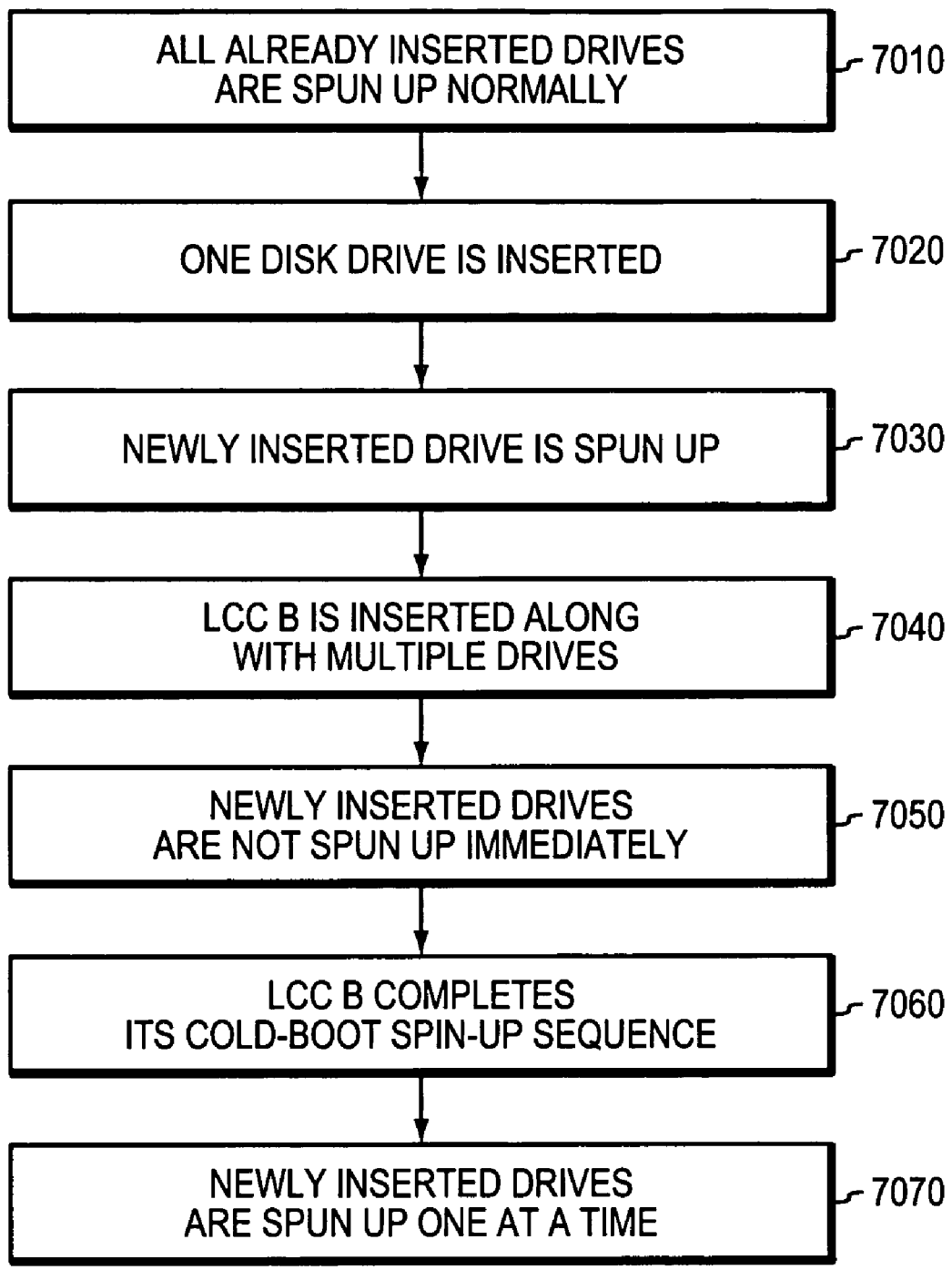

In the case of inserting drives and an LCC into an enclosure which is already running with one LCC, a sequence may proceed as described in the following example (FIG. 7). The enclosure is powered up with one LCC A present and any combination of drives already inserted.

1) All of the already inserted drives are spun up normally (step 7010).

2) One disk drive is inserted (step 7020).

3) The newly inserted drive is spun up (step 7030).

4) LCC B is inserted along with multiple drives (step 7040).

5) The newly inserted drives are not spun up immediately (step 7050).

6) LCC B completes its cold-boot spin-up sequence (step 7060).

7) The newly inserted drives are spun up one at a time (step 7070).

In at least one implementation, spinning up the newly inserted drives one at a time achieves an advantageous balance in which drives are spun up timely but unnecessary complexity is avoided in a system implemented with two power sources but able to run on only one, and in which drive spin up is coordinated between the LCCs.

As described, the newly inserted drives are not spun up until the new LCC completes its boot sequence. This is achieved by communication between the two LCCs such that the new LCC indicates to the existing LCC that it has not completed its boot sequence. After completion, the LCCs proceed in the master/slave methodology described above.

Thus the master/slave procedure to power up the newly inserted drives helps avoid inter-LCC conflict with respect to the order in which to spin up the newly inserted drives.

As noted above, if one LCC is executing a cold boot, it sends a message over an asynchronous serial link to the other LCC stating that it is cold boot powerup state, so that the other LCC's spinup procedure is aware.

An alternative "loosely coupled" technique for steady state drive spin up includes an open loop solution that leaves the LCCs loosely coupled and that relies on other drive signals including Enable Bypass signals. In the loosely coupled technique, the LCCs do not communicate directly. Both techniques may be implemented in LCC firmware and are operable with the same hardware and midplane logic.

When a drive is added in the steady state situation, each LCC detects a corresponding drive inserted signal and needs to react. In at least one implementation, each LCC polls periodically to detect the signal. Since the LCCs do not coordinate in the polling, they may poll out of synchronization with each other, such that one of the LCCs detects the newly added drive before (e.g., tens or hundreds of milliseconds before) the other LCC. Since the drive cannot spin up until both LCCs are directing it to be powered up, the drive's spinup does not start until after the later of the two drive insert detections. If only one new drive is added, there is no need for coordination, because the drive's spin up is simply slightly delayed.

However, a different approach is needed to address the case in which multiple new drives are added nearly simultaneously. Otherwise, in such a case, the fact that LCCs detect insertions at different times can lead to unintended overlap in drive spinup, during which power guidelines are violated. For example, if LCC A detects new drive X half a second later than LCC B, drive X spinup starts half a second later than directed by LCC B. If LCC A then detects new drive Y earlier than LCC B, drive Y spinup is not similarly delayed, and could be started before drive X spinup is completed, resulting in unintended overlap. To help prevent such overlap, in the different approach, each LCC may use an extended drive spinup time, e.g., 13 or 14 seconds instead of a standard 12 seconds per drive specifications. In general, the drive spinup time used by the LCCs may be extended at least enough to cover any potential delay in spinup caused by the LCCs detecting insertions at different times.

In at least some cases, the steady state drive spinup strategy relies on the LCCs having the same drive insert history, i.e., having the same information about how many drives, if any, require spinup. In particular, the strategy may produce unintended results in a situation in which the LCCs are inconsistent as to the number of newly inserted drives. Since the LCCs do not coordinate polling for detections of drive insertions, for example, at a given point in time one LCC may determine that there are 5 newly inserted drives and the other LCC may determine that there are 6 newly inserted drives. To help avoid such inconsistency, each LCC applies a debouncing technique such that the LCC does not finalize its count of newly inserted drives until the count is the same for multiple consecutive polls (e.g., until the count stops changes, which means two consecutive polls). Thus, once both LCCs have their counts, the LCCs can apply the same strategy to spinning up the newly inserted drives, e.g., by starting with the drive with the lowest ALPA address.

However, when a new LCC is hot plugged, the new LCC does not have the same insert history as the existing LCC—in fact, the new LCC cannot immediately determine whether any of existing drives in the system are in the process of spinup, or whether any drives that are inserted after the new LCC can be spun up immediately. Thus, without some direct or indirect coordination with the existing LCC, the new LCC cannot direct a drive to spin up without some risk of violating power guidelines.

When new drives are inserted, LCCs A and B need to agree on which drive to spin up first. As noted above, if both LCCs have the same drive insert history, the LCCs can apply the same strategy to spinning up the newly inserted drives. The loosely coupled technique also relies on the fact that a drive's Enable Bypass signal is asserted whenever the drive is powered off, i.e., whenever the drive has been directed by power control lines to power down. Each LCC can independently determine the state of a drive's Enable Bypass signal.

In the loosely coupled technique, the state of the Enable Bypass signal is used by one LCC to determine whether a drive is being held in a powered down state by the other LCC.

Figure 8:
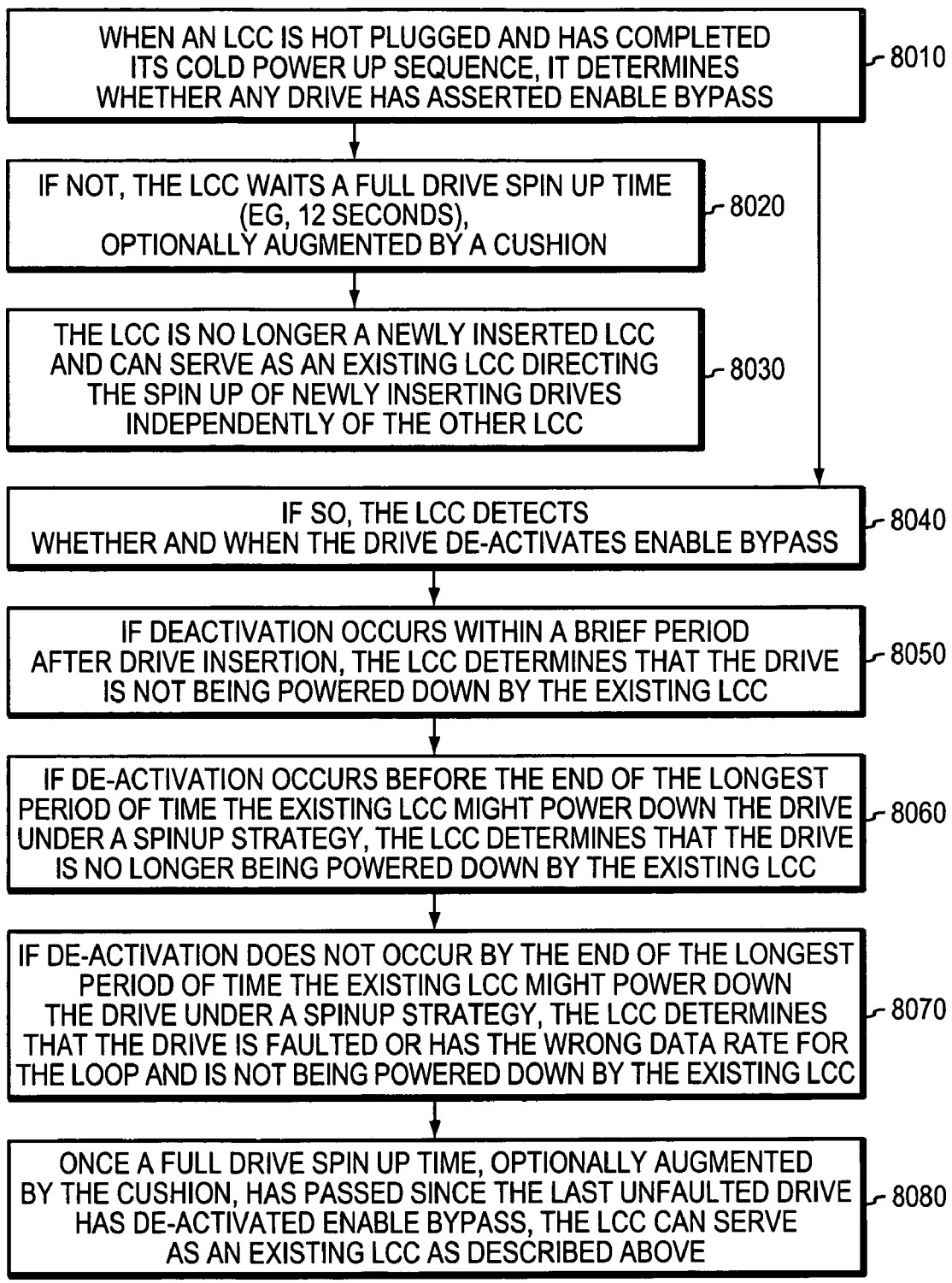

With reference to FIG. 8, in accordance with the loosely coupled technique, when an LCC is hot plugged and has completed its cold power up sequence, it determines whether any drive has asserted Enable Bypass (which may indicate ongoing drive spinup staging by the existing LCC) (step 8010).

If not, the LCC waits a full drive spin up time (e.g., 12 seconds), optionally augmented by a cushion (e.g., 1 or 2 seconds) (step 8020). This is because one or more of the drives may have started its spinup just before the LCC was hot plugged. Subsequently for at least the purpose of spinning up newly inserted drives the LCC is no longer a newly inserted LCC, is fully up to date with respect to drive insert history, and can serve as an existing LCC directing the spin up of newly inserting drives independently of the other LCC (step 8030).

If a drive is asserting Enable Bypass, the LCC treats the drive as unavailable in its steady state spinup sequence (e.g., leaves the drive for reconsideration at the end of the sequence) and proceeds as follows. Since a drive's Enable Bypass signal may be activated under any of multiple circumstances, including (1) for a brief period (e.g., 2 seconds) on powerup, (2) when the drive is faulted or has the wrong data rate for the Fibre Channel loop, and (3) when the drive is plugged in and powered down by power control, the LCC needs to determine which circumstances apply before concluding from an activated Enable Bypass signal that the other LCC is directing the drive to power down.

The LCC detects whether and when the drive de-activates Enable Bypass (step 8040). If deactivation occurs within a brief period (e.g., 2 or 3 seconds) after drive insertion, the LCC determines that the drive is not being powered down by the existing LCC (step 8050).

If de-activation occurs before the end of the longest period of time the existing LCC might power down the drive under a spinup strategy (e.g., 48 or 60 seconds), the LCC determines that the drive is no longer being powered down by the existing LCC (step 8060).

If de-activation does not occur by the end of the longest period of time the existing LCC might power down the drive under a spinup strategy (e.g., 48 or 60 seconds), the LCC determines that the drive is faulted or has the wrong data rate for the loop and is not being powered down by the existing LCC (step 8070).

Once a full drive spin up time, optionally augmented by the cushion, has passed since the last unfaulted drive has de-activated Enable Bypass, the LCC can serve as an existing LCC as described above (step 8080).

In at least some implementations, a steady state spinup solution may use all or part of a variation of the tightly coupled or loosely coupled techniques described above, or of a combination of the techniques. In general, the hot plugged LCC needs to gain some information in some way from the existing LCC. For example, if both LCCs were present at enclosure cold powerup, no coordination is necessary; otherwise, the existing LCC could provide a drive insert history update over the I²C path to the hot plugged LCC. Thus, the LCCs could execute independently and then coordinate when a history update is needed. In at least one implementation, since each LCC can detect whether its peer is inserted, an LCC executing alone could switch its strategy to include coordination when another LCC is inserted.

In a variation, instead of relying on the hot plugged LCC to catch up with respect to drive insert history, the steady state spinup technique can rely primarily on the existing LCC which has a priori knowledge and can detect when the hot plugged LCC is inserted. In particular, when the hot plugged LCC is inserted, the existing LCC can slow down and wait, i.e., hold off on any further spinups. The hot plugged LCC, for its part, can then simply wait a full drive spin up time (e.g., 12 seconds), optionally augmented by a cushion (e.g., 1 or 2 seconds), at which point the LCCs are able to properly execute steady state spinup strategy independently of each other.

In a hardware variation, if each LCC is able to determine directly the state of the other LCC's power control bits, a hot plugged LCC can determine how to respond to and coordinate with the existing LCC's spinup actions by tracking the state of the existing LCC's power control bits.

Other embodiments are within the scope of the following claims. For example, the above-described procedures may be implemented, entirely or in part, in firmware or software or both firmware and software.

What is claimed is:

1. Apparatus for use in a storage system, comprising:
   a plurality of disk drives newly inserted into a data storage system enclosure, the plurality of disk drives constituting newly inserted disk drives wherein, at the time the plurality of disk drives are newly inserted, the storage system already contains at least one disk drive that is already spun up normally;
   first and second control cards in the enclosure;
   first control logic operable to cause the first and second control cards to coordinate to cause the newly inserted disk drives to spin up in stages.

2. The apparatus of claim 1 wherein the first control logic is further operable to help prevent the newly inserted disk drives from drawing excessive power during spin up.

3. The apparatus of claim 1 wherein the first control logic is disposed on at least one of the first and second control cards.

4. The apparatus of claim 1 wherein the first control logic causes the first control card to drive the second control card in a master slave protocol.

5. The apparatus of claim 1 wherein the first and second control cards communicate with a same newly inserted disk drive and the first control logic causes the first control card to determine a state of the second control card from the status of the disk drive.

6. The apparatus of claim 1 wherein at least one of the disk drives can be powered off by the first control card independently of the second control card.

7. The apparatus of claim 1 wherein the first control card lacks the ability to determine directly whether power to one of the newly inserted disk drives is being held off by the second control card.

8. The apparatus of claim 1 wherein the first control card uses an extended drive spin up time to help avoid drive spin up overlap.

9. The apparatus of claim 1 wherein the first control card uses a debouncing technique to help avoid mismatched counting of the number of newly inserted drives.

10. The apparatus of claim 1 wherein the first control card directs the second control card when to spin up one of the newly inserted drives.

11. A method for use in managing disk drive spinup, the method comprising:
    determining whether any drive has asserted Enable Bypass;
    if no drive has asserted Enable Bypass, waiting a full drive spin up time;
    if a drive is asserting Enable Bypass, treating the drive as unavailable in a steady state spinup sequence; and
    depending on when the drive de-activates Enable Bypass, determining that the drive is not being powered down.

12. The method of claim 11, further comprising:
    if de-activation occurs before the end of the longest period of time an existing control card powers down the drive under a spinup strategy, determining that the drive is no longer being powered down by the existing control card.

13. The method of claim 11, further comprising:
    if de-activation does not occur by the end of the longest period of time an existing control card powers down the drive under a spinup strategy, determining that the drive is faulted or has a wrong data rate.

* * * * *